United States Patent [19]

Masui

[11] Patent Number: 4,848,836
[45] Date of Patent: Jul. 18, 1989

[54] HEADREST FOR USE IN VEHICLES

[75] Inventor: Toshio Masui, Ayase, Japan

[73] Assignee: Ikeda Bussan Co., Ltd., Ayase, Japan

[21] Appl. No.: 261,424

[22] Filed: Oct. 24, 1988

[30] Foreign Application Priority Data

Oct. 22, 1987 [JP] Japan .................. 62-160848

[51] Int. Cl.[4] .............................................. A61G 15/00
[52] U.S. Cl. ...................................... 297/220; 297/410
[58] Field of Search ................ 297/220, 391, 410; 5/406, 407, 448

[56] References Cited

U.S. PATENT DOCUMENTS 4,099,772 7/1978 Barecki .......................... 297/220
4,673,214 6/1987 Meiller .......................... 297/410

FOREIGN PATENT DOCUMENTS 3135904 4/1983 Fed. Rep. of Germany ...... 297/220

Primary Examiner—James T. McCall
Attorney, Agent, or Firm—Foley & Lardner, Schwartz, Jeffery, Schwaab, Mack, Blumenthal & Evans

[57] ABSTRACT

A headrest for use in vehicles comprising a headrest frame, a pair of headrest stays fixed to the headrest frame, a pad material for enclosing the headrest frame, and a surface skin material provided with an opening at the underside thereof and serving to cover a headrest pad assembly formed by enclosing the headrest frame with the pad material, wherein cut-away holes for allowing the headrest stays to pass there-through are formed at one of both opposed rims of the opening and one of strip-like male and female fasteners which is divided into three parts is attached to the one rim which is divided into three parts because of the cut-away holes, while the other of the male and female fasteners which is divided into two parts at the center thereof is attached to the other rim of the opening of the surface skin material.

6 Claims, 3 Drawing Sheets

HEADREST FOR USE IN VEHICLES

BACKGROUND OF THE INVENTION

1. Field of the Invention

The present invention relates to a headrest for use with seats in vehicles and more particularly, it relates to a headrest of such type that a headrest pad assembly provided with headrest stays is covered by a surface skin material.

2. Prior Art

Seats for use in vehicles are bound to have headrests to protect heads of those persons who are in vehicles at the time when their vehicles are dashed from behind or damaged by some accident like this while driving. Some of the headrests are made integral to their seat backs as a unit, but most of them are of the type that they have stays for enabling them to be detached from their seat backs so as to meet physical needs of persons who sit on their seats. FIG. 1 shows the conventional headrest of this type.

This headrest 1 comprises a headrest frame 2 made of hard material such as metal, headrest stays 3 fixed to the headrest frame 2, a pad material 4 enclosing the headrest frame 3, and a surface skin material 5 covering the pad material 4. The surface skin material 5 is made as a bag having a slit-like opening 6 at the underside thereof. Both rims of the opening 6 are pulled in a direction S in FIG. 1 and the headrest 1 is pushed into the thus-widened opening 6, so that the surface skin material 5 can cover the pad material 4.

As shown in FIG. 2, holes 8 for allowing the headrest stays 3 to pass therethrough are provided at a rim 7 of the opening 6 and a triple-divided female fastener 9 is sewed to the surface skin material 5 along this rim 7 which has been divided into three parts by the holes 8 while a triple-divided male fastener 10 is similarly sewed to the surface skin material 5 along another rim 7', corresponding to the female fastener 9 on the opposite rim 7. When the male and female fasteners 9 and 10 are engaged with each other, the opening 6 of the surface skin material 5 is closed, leaving the stays 3 passed through the holes 8.

When the rims of the opening 6 are processed as described above, however, the width of the slit-like opening 6 opened as shown in FIG. 2 is limited by those portions of the fasteners 9 and 10 which are attached along the rims between the holes 8. As the result, the width of the opening 6 opened becomes smaller than that of the pad material 4, thereby making it difficult to push the pad material 4 into the surface skin material 5, that is, to cover the pad 4 with the surface skin 5. Further, each of the fasteners 9 and 10 is divided into three parts because of the holes 8 and this means that the number of parts to be used increases and the increased parts make it troublesome and inefficient to attach them along the rims 7. Furthermore, each of the fasteners 9 and 10 has six edges 11, as apparent from FIG. 3, and persons who try to adjust the height of their headrests in vehicles sometimes hurt their hands by these edges 11.

SUMMARY OF THE INVENTION

The object of the present invention is therefore to provide a headrest capable of being used with seat backs in vehicles and more easily covering the pad assembly with the surface skin and reducing the number of parts used to process the rims of the opening in the surface skin.

This object of the present invention can be achieved by a headrest comprising a headrest frame, two headrest stays attached to the headrest frame, a pad material enclosing the headrest, and a surface skin material shaped like a bag having an opening at the underside thereof through which an assembly of the headrest frame, stays and pad is pushed so as to enable the assembly to be covered by the surface skin material, leaving the stays projecting outside through the surface skin material, wherein cut-away holes for allowing the stays to pass therethrough are formed at one of opposed rims of the opening, and one of male and female fasteners which is divided into three parts because of the cut-away holes for the stays is attached to the surface skin material along the one rim while the other of the male and female fasteners which is divided into two parts at the center thereof is attached to the surface skin material along the other rim of the opening.

According to the present invention, one of the fasteners attached to the surface skin material along one of the rims of the opening is divided into two parts at the center thereof. When the surface skin material is to cover the pad material, therefore, the opening of the surface skin material can be spread wider, making it easier to cover the pad material with the surface skin material.

Further, one of the fasteners is divided into only two parts. Therefore, the number of parts to be used is reduced and this makes it easier to attach them along one of the rims. Furthermore, one of the fasteners has only four edges and this makes it less often that persons who try to adjust the height of their headrests in vehicles may hurt their hands by the edges.

These and other objects as well as merits of the present invention will become apparent from the following detailed description with reference to the accompanying drawings.

DETAILED DESCRIPTION OF THE PREFERRED EMBODIMENT

Figure 1:
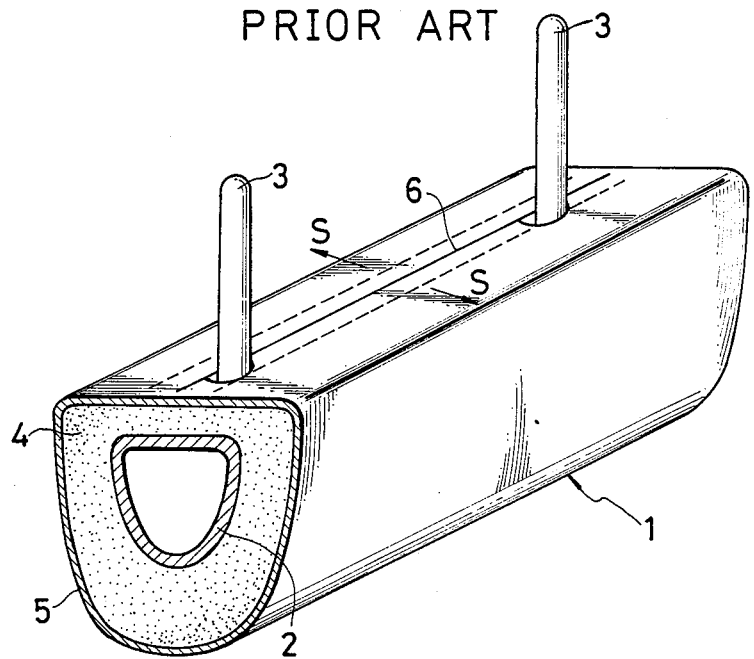
FIG. 1 is a perspective view, partly sectioned, showing the conventional headrest for use in vehicles.
Figure 2:
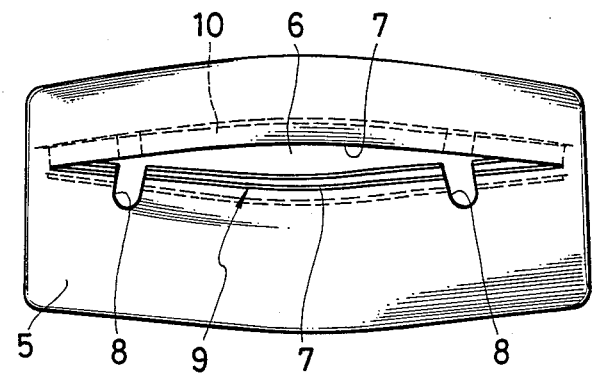
FIG. 2 is a front view showing the opening of the surface skin material in FIG. 1 spread.
Figure 3:
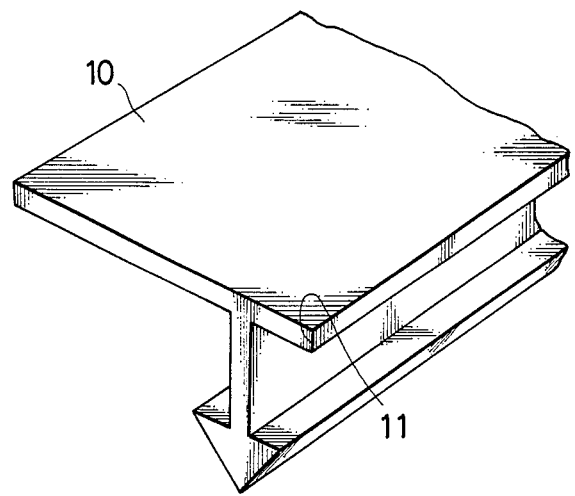
FIG. 3 is a perspective view showing a male fastener enlarged, said fastener being attached to the surface skin material along one of the rims of the opening.
Figure 4:
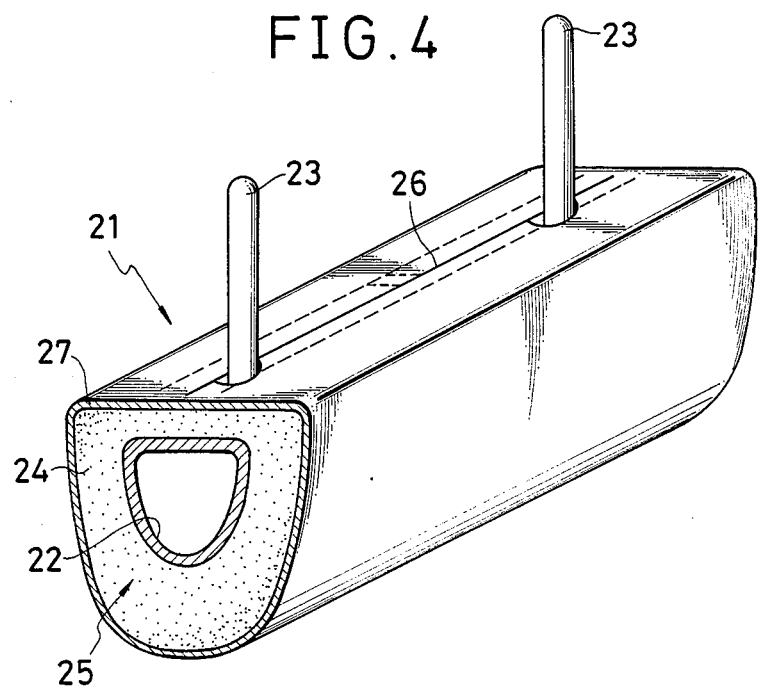
FIG. 4 is a perspective view, partly sectioned, showing an example of the headrest for use in vehicles according to the present invention.

As shown in FIG. 4, a headrest 21 for use in vehicles comprises a headrest frame 22, a pair of headrest stays 23 fixed to the underside of the headrest frame 22, a pad material 24 made of urethane and enclosing the headrest frame 22, and a surface skin material 27 made of cloth or synthetic resin and shaped like a bag having an opening 26 formed at its underside, wherein a pad assembly 25 comprising enclosing the headrest frame 22 with the pad material 24 is pushed into the bag-like surface skin material 27 through the opening 26 thereof and thus covered with the surface skin material 27, leaving the headrest stays 23 projected outside. The opening 26 of the surface skin material 27 is processed to have the following rim arrangement.

Figure 5:
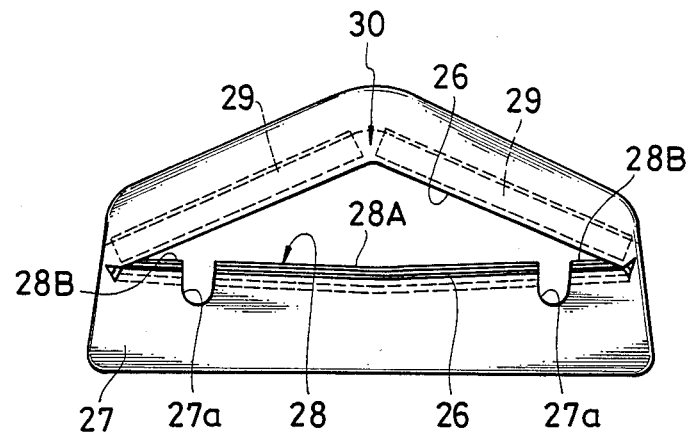
FIG. 5 is a front view showing the opening of the surface skin material in FIG. 4 spread wide.

As shown in FIG. 5, cut-away holes 27a for allowing the headrest stays 23 to pass therethrough are formed at one rim of the opening 26 of the surface skin material 27. A female fastener 28 of strip-like male and female fasteners which are sewed to both rims of the opening 26 is divided into a main part 28A and both side parts 28B which correspond to three parts the one rim divided by the cut-away holes 27a. A male fastener 29 which is sewed to the other rim of the opening 26 to be engageable with the female fastener 28 is divided into two parts at the center 30 thereof. In other words, one of two parts of the male fastener 29 is engaged with one of the both side parts 28B and the half of the main part 28A of the female fastener 28 to bridge the one side part 28B and the main part 28A, while the other of two parts of the male fastener 29 is engaged with the other of the both side parts 28B and the remaining half of the main part 28A of the female fastener 28 to bridge the other side part 28B and the main part 28A.

Figure 6:
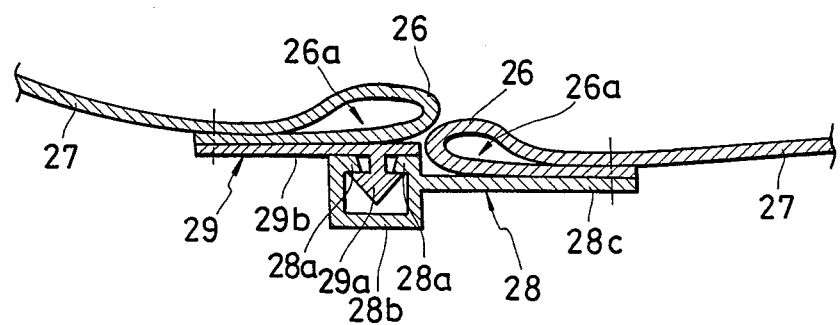
FIG. 6 is a sectional view showing how the fasteners attached to the surface skin material along the rims of the opening are engaged with each other.

As shown in FIG. 6, each of the fasteners 28 and 29 is made of synthetic resin which can be sewed to both rims of the opening 26. The male fastener 29 includes a projection 29a, triangular in section, at the foremost end thereof and a rectangular margin 29b connected to the base of the projection 29a. On the other hand, the female fastener 28 includes a housing 28b into which the projection 29a of the male fastener 29 can be pushed and which is provided with stoppers the male fastener 29 is engaged with the female one 28, keeping its projection 29a pushed into the housing 28b of the female fastener 28, and a rectangular margin 28c connected to the housing 28b. When the male fastener 29 is pushed into the female fastener hooked by the stoppers 28a of the housing 28b of the female fastener 28, thereby keeping the male fastener 29 engaged with the female one 28. Both rims of the opening 26 of the surface skin material 27 are folded back toward the underside thereof to such an extent that each of the folded portions 26a equals to the width of each of the margins 28c and 29b of the male and female fasteners 28 and 29, which are sewed to these folded portions 26a of both rims of the opening 26.

When the opening 26 of the surface skin material 27 whose both rims are processed as described above is spread, pulling both rims of the opening 26 outward, as shown in FIG. 5, the male fastener 29 can be separated from each other at the center 30 thereof because it is divided into two parts. This enables the opening 26 of the surface skin material 27 to be spread wider than the width of the pad assembly 25, thereby making it easier to cover the pad assembly 25 with the surface skin material 27. Further, the male fastener 29 is engaged with the female one 28 in such a way that two parts of the former connect three parts of the latter. Therefore, the male and female fasteners can be engaged with each other with higher stability.

It should be understood that the present invention is not limited to the above-described headrest, but it may be arranged that the male fastener 29 is divided into three parts while the female fastener 28 into two parts, instead of the case where the male fastener 29 is divided into two parts while the female fastener 28 into three parts.

What is claimed is:

1. A headrest for use in vehicles comprising a headrest frame, a pair of headrest stays fixed to the headrest frame, a pad material for enclosing the headrest frame, and a surface skin material shaped like a bag to cover a headrest pad assembly formed by enclosing the headrest frame with the pad material, wherein said surface skin material has an opening at the underside thereof through which the headrest pad assembly is pushed, cut-away holes for allowing the headrest stays to pass therethrough are formed at one of both opposed rims of the opening, and one of male and female fasteners which is attached to the one rim of the opening is divided into three parts because of the cut-away holes while the other of the male and female fasteners which is attached to the other rim of the opening is divided into two parts.

2. A headrest for use in vehicles according to claim 1 wherein said male fastener includes a projection, triangular in section, at the foremost end thereof and a margin connected to the base of the projection and sewed to the surface skin material.

3. A headrest for use in vehicles according to claim 2 wherein said female fastener includes a housing into which the projection of the male fastener is pushed and which is provided with stoppers for stopping the projection of the male fastener from coming out of the housing, and a margin connected to the housing and sewed to the surface skin material.

4. A headrest for use in vehicles according to claim 3 wherein when the male fastener is pushed into the female one, the projection of the male fastener is hooked by the stoppers of the housing of the female fastener to thereby enable both of the fasteners to be engaged with each other.

5. A headrest for use in vehicles according to claim 1 wherein that one of said male and female fasteners which is divided into three parts includes a main part extending along the center portion of the fastener and side parts extending at both sides of the main part.

6. A headrest for use in vehicles according to claim 5 wherein that one of the male and female fasteners which is divided into two parts is divided at the center thereof and one of these two parts is engaged with one side part and the half of the main part of the other fastener to bridge them while the other is engaged with the other side part and the remaining half of the main part of the other fastener to bridge them.

* * * * *